United States Patent
Kim et al.

(10) Patent No.: US 12,401,388 B2
(45) Date of Patent: Aug. 26, 2025

(54) SPECTRUM SENSING APPARATUS AND THE OPERATION METHOD

(71) Applicant: RESEARCH & BUSINESS FOUNDATION SUNGKYUNKWAN UNIVERSITY, Suwon-si (KR)

(72) Inventors: Yu Sung Kim, Suwon-si (KR); Keun Hong Chae, Suwon-si (KR); Jung In Park, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 497 days.

(21) Appl. No.: 17/965,127

(22) Filed: Oct. 13, 2022

(65) Prior Publication Data
US 2023/0188176 A1 Jun. 15, 2023

(30) Foreign Application Priority Data
Oct. 13, 2021 (KR) .................. 10-2021-0135883

(51) Int. Cl.
*G06V 10/44* (2022.01)
*H04B 1/69* (2011.01)

(52) U.S. Cl.
CPC ............ *H04B 1/69* (2013.01); *G06V 10/454* (2022.01)

(58) Field of Classification Search
None
See application file for complete search history.

(56) References Cited

U.S. PATENT DOCUMENTS

| | | | | |
|---|---|---|---|---|
| 2008/0080604 | A1* | 4/2008 | Hur | H04L 27/0004 375/224 |
| 2012/0294168 | A1* | 11/2012 | Freda | H04B 1/0067 370/252 |
| 2013/0177109 | A1* | 7/2013 | Ozaki | H04B 1/1027 375/343 |
| 2016/0269205 | A1* | 9/2016 | Anthony | H04L 12/4633 |
| 2016/0286532 | A1* | 9/2016 | Karabinis | H04L 9/00 |
| 2017/0093603 | A1* | 3/2017 | Hu | H04B 1/7103 |

FOREIGN PATENT DOCUMENTS

| | | |
|---|---|---|
| JP | 2012-531069 A | 12/2012 |
| KR | 10-2012-0101463 A | 9/2012 |
| KR | 10-1466896 B1 | 12/2014 |
| KR | 10-2316671 B1 | 10/2021 |

OTHER PUBLICATIONS

Jung, Tae-Yun, et al. "CNN Based Spectrum Sensing Technique for Cognitive Radio Communications." Journal of the Korea Institute of Information and Communication Engineering 24.2 (2020): 276-284.

* cited by examiner

*Primary Examiner* — Idowu O Osifade

(57) ABSTRACT

The present invention provides a spectrum sensing apparatus including a receiver which receives an analog signal in a frequency band of interest; an ADC(Analog Digital Caonverter) which samples the analog signal to output a digital signal; a correlator which performs the auto-correlation of the digital signal to output a correlation function; and a controller which generates an image pattern corresponding to the correlation function and identifies whether to occupy the frequency band of interest according to the image pattern.

9 Claims, 4 Drawing Sheets

[Fig 1]
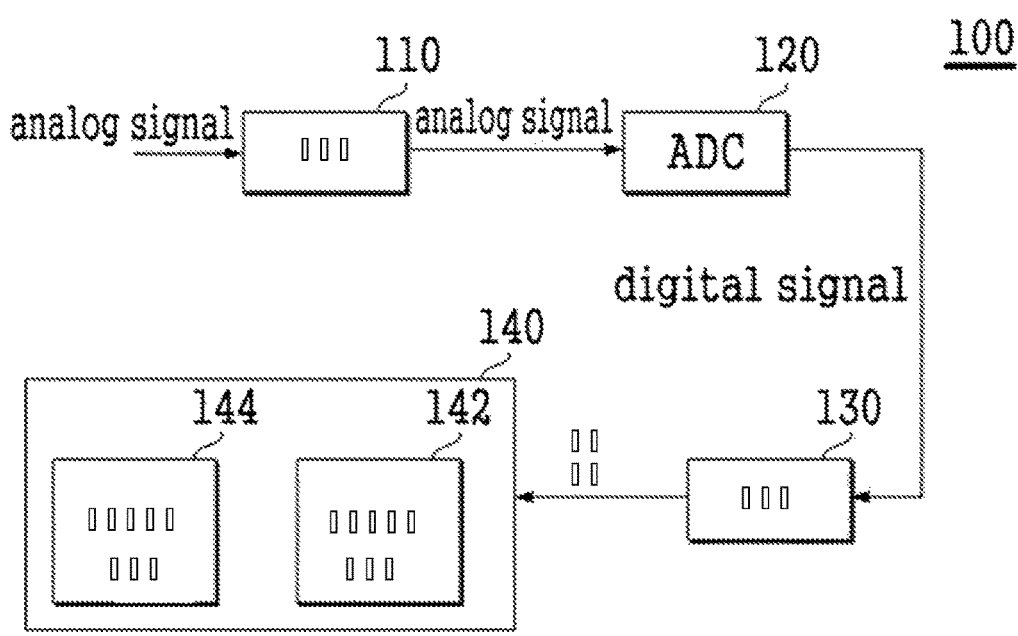

[Fig 2]
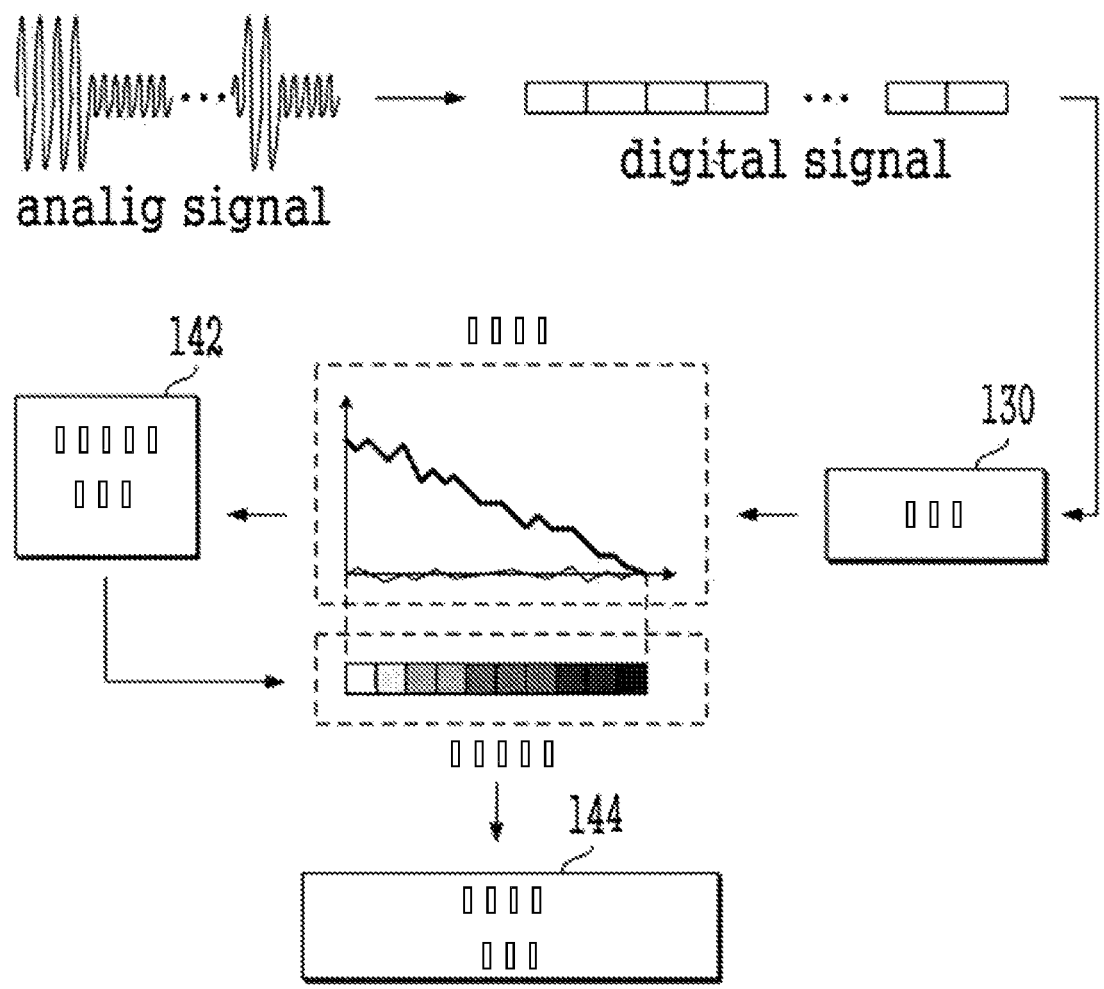

[Fig 3]
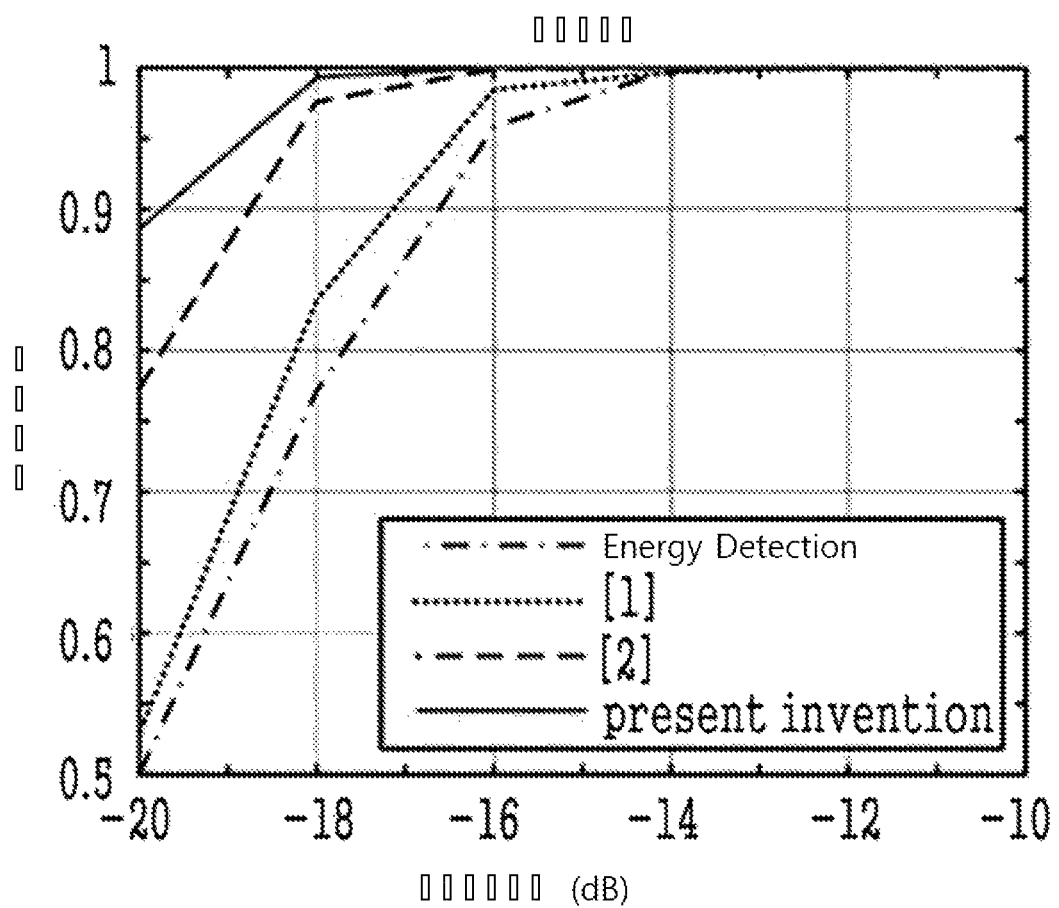

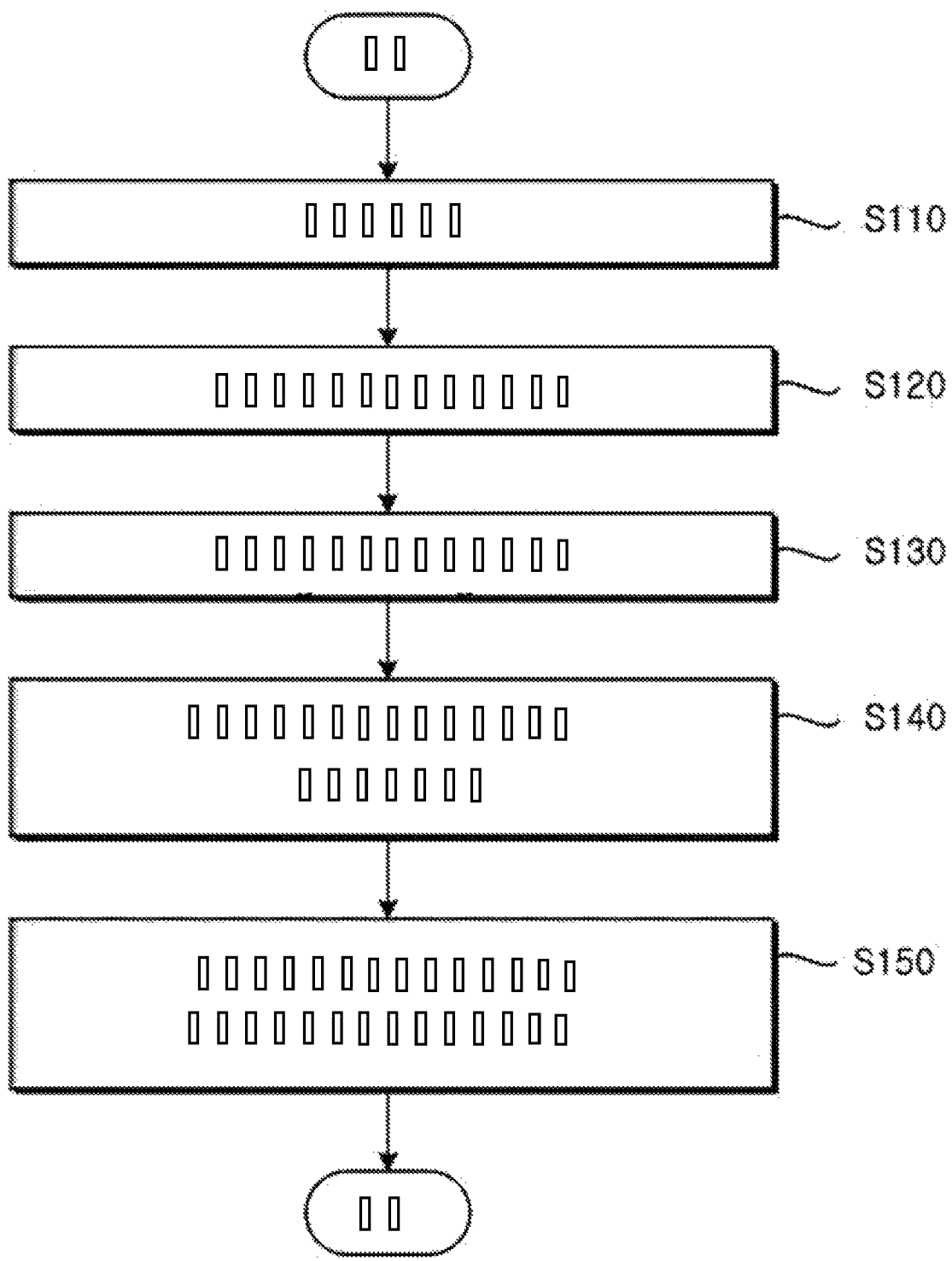

SPECTRUM SENSING APPARATUS AND THE OPERATION METHOD

TECHNICAL FIELD

The present invention relates to a spectrum sensing apparatus and an operation method thereof, and more particularly, to a spectrum sensing apparatus which easily determines whether to occupy a frequency band of interest by training a signal correlation array by a convolutional neural network (CNN) and an operation method thereof.

BACKGROUND ART OF INVENTION

Recently, as various communication technologies are utilized for complex purposes in multiple bands, there is a need for a method for efficiently utilizing limited frequency resources. Even though the number of bands and bandwidths are limited resources, the communication speed is increasing day by day, so that a dynamic spectrum access technique which efficiently uses the frequency band is attracting attention.

The most essential element in the dynamic frequency access technology is a spectrum sensing technique which determines whether the frequency band is currently being utilized.

Generally, the existing spectrum sensing technologies are being studied based on rules. As a representative rule-based spectrum sensing technology, there is an energy detection technique which determines whether an energy of the received signal is equal to or higher than a specific threshold to determine whether there is a signal.

The rule-based technique, such as the energy detection technique, is based on a statistical value of the signal so that there is a problem in that the performance is degraded in the environment of a low signal-to-noise ratio with a bad signal statistic quality.

Recently, the study on the spectrum sensing technology is developing to utilize deep learning to achieve a high success rate even in a low signal-to-noise ratio environment.

DISCLOSURE OF INVENTION

Technical Problem to Be Solved

An object of the present invention is to provide a spectrum sensing apparatus which easily determines whether to occupy a frequency band of interest by training a signal correlation array by means of a convolutional neural network (CNN) and an operation method thereof.

The object of the present invention is not limited to the above-mentioned objects and other objects and advantages of the present invention which have not been mentioned above can be understood by the following description and become more apparent from exemplary embodiments of the present invention. Further, it is understood that the objects and advantages of the present invention may be embodied by the means and a combination thereof in the claims.

Technical Solution to Solve Problems

According to an aspect of the present invention, a spectrum sensing apparatus includes: a receiver which receives an analog signal of a frequency band of interest; an ADC (Analog Digital Caonverter) which samples the analog signal to output a digital signal; a correlator which performs the auto-correlation of the digital signal to output a correlation function; and a controller which generates an image pattern corresponding to the correlation function and identifies whether to occupy the frequency band of interest according to the image pattern.

The correlator delays a time of the digital signal input for a predetermined time to output the correlation function.

The controller includes an image pattern generator which generates an image pattern corresponding to a changing pattern of the correlation function; and a band occupation estimator which identifies whether to occupy the frequency band of interest based on the image pattern.

The image pattern generator generates the image pattern in which a brightness varies corresponding to the changing value in a changing pattern of the correlation function.

The image pattern increases a brightness of the image when a changing value of the changing pattern of the correlation function is higher than a predetermined reference value and lower the brightness of the image when the changing value is lower than the predetermined reference value.

The band occupation estimator learns a signal correlation array by applying previous image patterns which are input in the past to the convolutional neural network (CNN) and when the image pattern is input, applies the image pattern to the signal correlation array to identify whether to occupy the frequency band of interest.

According to another aspect of the present invention, an operation method of a spectrum sensing apparatus includes: receiving an analog signal of a frequency band of interest, by a receiver; sampling the analog signal to output a digital signal, by an ADC(Analog Digital Caonverter); performing the auto-correlation of the digital signal to output a correlation function, by a correlator; and generating an image pattern corresponding to the correlation function and identifying whether to occupy the frequency band of interest according to the image pattern, by a controller.

In the identifying whether to occupy the frequency band of interest, the image pattern in which a brightness varies corresponding to the changing value is generated in a changing pattern of the correlation function.

The image pattern increases a brightness of the image when a changing value of the changing pattern of the correlation function is higher than a predetermined reference value and lower the brightness of the image when the changing value is lower than the predetermined reference value.

In the identifying whether to occupy the frequency band of interest, a signal correlation array is learned by applying previous image patterns which are input in the past to the convolutional neural network (CNN) and when the image pattern is input, the image pattern is applied to the signal correlation array to identify whether to occupy the frequency band of interest.

Advantageous Efects of Invention

According to the present invention, a spectrum sensing apparatus and an operation method thereof may have advantages in that at least one receiver receives an analog signal of a frequency band of interest and it is identified whether to occupy the frequency band of interest by applying an image pattern corresponding to a correlation function output by auto-correlating a sampled digital signal to a signal correlation array trained by the convolutional neural network, thereby accurately identifying whether to occupy the frequency band of interest even in a low signal-to-noise ratio, that is, a low analog signal level, to improve a detection performance about whether to occupy the band.

The effects of the present invention are not limited to the aforementioned effects, and various other effects are included within a range which is obvious to those skilled in the art from the following description.

BRIEF DESCRIPTION OF DRAWINGS

FIG. 1 is a control block diagram illustrating a control configuration of a spectrum sensing apparatus according to the present invention.

FIG. 2 is an exemplary diagram for explaining an operation of a spectrum sensing apparatus according to the present invention.

FIG. 3 is a view illustrating a performance of a spectrum sensing apparatus according to the present invention.

FIG. 4 is a flowchart illustrating an operation method of a spectrum sensing apparatus according to the present invention.

DETAILED DESCRIPTION FOR IMPLEMENTING INVENTION

Those skilled in the art may make various modifications to the present invention which may have various embodiments thereof, and thus specific embodiments will be illustrated in the drawings and described in detail in the detailed description. However, this does not limit the present invention within specific exemplary embodiments, and it should be understood that the present invention covers all the modifications, equivalents and replacements within the spirit and technical scope thereof. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present invention, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present invention. A singular form may include a plural form if there is no clearly opposite meaning in the context. In the present application, it should be understood that the term "include" or "have" indicates that a feature, a number, a step, an operation, a component, a part, or the combination thereof described in the specification is present, but do not exclude a possibility of presence or addition of one or more other features, numbers, steps, operations, components, parts, or combinations, in advance.

If it is not contrarily defined, all terms used herein including technological or scientific terms have the same meaning as those generally understood by a person with ordinary skill in the art. Terms defined in generally used dictionaries shall be construed that they have meanings matching those in the context of a related art, and shall not be construed in ideal or excessively formal meanings unless they are clearly defined in the present application. Hereinafter, an exemplary embodiment of the present invention will be described in detail with reference to the accompanying drawings.

FIG. 1 is a control block diagram illustrating a control configuration of a spectrum sensing apparatus according to the present invention.

Referring to FIG. 1, a spectrum sensing apparatus 100 may include a receiver 110, an ADC(Analog Digital Converter) 120, a correlator 130, and a controller 130.

The receiver 110 may receive a wireless signal (analog signal) in an interest frequency band.

Here, the receiver 110 may include a filter which restricts a band width of the wireless signal (analog signal), but is not limited thereto.

In the exemplary embodiment, one receiver 110 has been illustrated and described, but a plurality of receivers may be implemented. Further, when the plurality of receivers 110 is provided, a plurality of ADCs 120 and a plurality of correlators 130 may be implemented, but is not limited thereto.

The receiver 110 may receive the wireless signal (analog signal) for a predetermined time, but the predetermined time is not limited.

The ADC 120 may sample the wireless signal (analog signal) into a digital signal.

At this time, the ADC 120 may sample the wireless signal (analog signal) according to a set sampling cycle.

The correlator 130 may perform the auto-correlation of the digital signal sampled in the ADC 120.

That is, the correlator 130 delays a time of the digital signal to perform the auto-correlation to output a correlation function.

When there is only a noise in the digital signal, the signal is uncorrelated so that the correlator 130 may output a correlation function which is not changed.

Further, when the digital signal includes a modulated signal, the correlator 130 may output a correlation function corresponding to the modulated signal.

The correlation function may have a pattern which is reduced as the time delay value is increased.

The controller 140 may include an image pattern generator 142 and a band occupation estimator 144.

The image pattern generator 142 may generate an image pattern corresponding to the correlation function output from the correlator 130.

That is, the image pattern generator 142 may generate a changing pattern of the correlation function, that is, the image pattern in which a brightness of the image varies so as to correspond to the changing value.

The image pattern may be a pattern in which when the changing value of the correlation function is higher than a predetermined reference value, the brightness of the image is increased and when the changing value of the correlation function is lower than the reference value, the brightness of the image is lowered.

That is, the larger the value of the correlation function, the brighter the image pattern and the smaller the value of the correlation function, the darker the image pattern.

The band occupation estimator 144 may apply previous image patterns which have been input in the past to the convolutional neural network (CNN) to train the signal correlation array.

The convolutional neural network may be configured by three convolutional layers and two fully connected layers, but is not limited thereto.

Here, the convolutional neural network may learn whether to occupy the frequency band of interest based on the previous image patterns and deduce a result of learning with the currently input image pattern and whether to occupy the frequency band of interest based on the learning result.

The band occupation estimator 144 may output a result about whether to occupy the frequency band of interest by applying the image pattern to the signal correlation array trained in the convolutional neural network as described above.

When the plurality of receivers 110, the plurality of ADCs 120, and the plurality of correlators 130 are provided, the image pattern generators 142 may generate an image pattern for each of the plurality of correlation functions, as for one receiver 110, one ADC 120, and one correlator 130.

At this time, the band occupation estimator 144 may train the signal correlation array by applying a plurality of previous image patterns which has been input in the past to the convolutional neural network.

As compared with the case of learning for the wireless signal (analog signal) input from one receiver 110, in the case of learning for wireless signals (analog signals) input from the plurality of receivers 110, the learning ability of the band occupation estimator 144 for the result of whether to occupy the frequency band of interest may be improved.

As described above, it is advantageous in that the spectrum sensing apparatus 100 according to the present invention generates and learns an image pattern corresponding to a pattern of the correlation function for the wireless signal (analog signal) input from at least one receiver 110, the ADC 120, and the correlator 130 to identify whether to occupy the frequency band of interest even at a low signal-to-noise ratio of the wireless signal (analog signal).

[2.3]

FIG. 2 is an exemplary diagram for explaining an operation of a spectrum sensing apparatus according to the present invention and FIG. 3 is a view illustrating a performance of a spectrum sensing apparatus according to the present invention.

Referring to FIGS. 2 and 3, the receiver 110 of the spectrum sensing apparatus 100 may receive a wireless signal (analog signal) transmitted in the frequency band of interest.

At this time, the receiver 110 may input the wireless signal (analog signal) to the ADC 120 and the ADC 120 may sample the wireless signal (analog signal) to output a digital signal.

The correlator 130 delays a time of the digital signal to perform the auto-correlation to output a correlation function.

The image pattern generator 142 of the controller 140 may generate an image pattern based on a changing value of the correlation function.

At this time, the image pattern generator 142 may generate an image pattern in which a brightness varies in accordance with the changing value of the correlation function, but is not limited thereto.

The band occupation estimator 144 of the controller 140 may identify whether to occupy the frequency band of interest based on the image pattern.

At this time, the band occupation estimator 144 may learn the previous image patterns which have been input in the past with the convolutional neural network to apply the previous image patterns to the input image pattern to identify whether to occupy the frequency band of interest.

Here, the graph illustrated in FIG. 3 is a view illustrating a determination performance about whether to occupy the interest frequency band.

[1] and [2] are views of comparing a deep learning based dynamic pattern recognition spectrum sensing technique and the energy detection which is a deep learning-based method for radio recognition and is a representative rule-based technique of the related art and the present invention.

Here, a false alarm probability is fixed to 0.1, and the number of received samples and the number of receivers are set to be equal to set a fair comparison condition and the detection probability is illustrated at this time to compare the probabilities. By doing this, it is confirmed that the probability of the present invention is remarkably excellent.

[4]

FIG. 4 is a flowchart illustrating an operation method of a spectrum sensing apparatus according to the present invention.

Referring to FIG. 4, the receiver 110 of the spectrum sensing apparatus 100 may receive a wireless signal (analog signal) in the frequency band of interest (S110).

The ADC 120 of the spectrum sensing apparatus 100 may sample the wireless signal (analog signal) into a digital signal (S120).

The correlator 130 of the spectrum sensing apparatus 100 may perform the auto-correlation of the digital signal sampled in the ADC 120 (S130).

That is, the correlator 130 delays a time of the digital signal to perform the auto-correlation to output a correlation function.

When there is only a noise in the digital signal, the signal is uncorrelated so that the correlator 130 may output a correlation function which is not changed.

Further, when the digital signal includes a modulated signal, the correlator 130 may output a correlation function corresponding to the modulated signal.

The correlation function may have a pattern which is reduced as the time delay value is increased.

The image pattern generator 142 of the spectrum sensing apparatus 100 may generate an image pattern corresponding to the correlation function (S140).

That is, the image pattern generator 142 may generate a changing pattern of the correlation function, that is, the image pattern in which a brightness of the image varies so as to correspond to the changing value.

The image pattern may be a pattern in which when the changing value of the correlation function is high, the brightness of the image is increased and when the changing value of the correlation function is low, the brightness of the image is lowered.

The band occupation estimator 144 of the spectrum sensing apparatus 100 may apply the image pattern to the convolutional neural network (CNN) to train the signal correlation array and identify whether to occupy the frequency band of interest (S150).

That is, the band occupation estimator 144 may apply previous image patterns which have been input in the past to the convolutional neural network (CNN) to train the signal correlation array.

The convolutional neural network may be configured by three convolutional layers and two fully connected layers, but is not limited thereto.

Here, the convolutional neural network may learn whether to occupy the interest frequency band based on the previous image patterns and deduce a result of learning with the currently input image pattern and whether to occupy the frequency band of interest, based on the learning result.

The band occupation estimator 144 may output a result about whether to occupy the frequency band of interest by means of the convolutional neural network as described above.

The features, structures, effects, and the like described in the foregoing embodiments are included in at least one embodiment of the present invention and are not necessarily limited to one embodiment. Moreover, the features, structures, effects, and the like illustrated in each embodiment may be combined or modified by those skilled in the art for the other embodiments to be carried out. Therefore, the combination and the modification of the present invention are interpreted to be included within the scope of the present invention.

In the above description, the present invention has been described based on the exemplary embodiments, but the exemplary embodiments are for illustrative, and do not limit the present invention, and those skilled in the art will appreciate that various modifications and applications, which are not exemplified in the above description, may be made without departing from the scope of the essential characteristic of the present exemplary embodiments. For example, each constituent element specifically present in the exemplary embodiment may be modified and carried out. Further, the differences related to the modification and the application should be construed as being included in the scope of the present invention defined in the accompanying claims.

The invention claimed is:

1. A spectrum sensing apparatus, comprising:
a receiver which receives an analog signal of a frequency band of interest;
an ADC (Analog Digital Converter) which samples the analog signal to output a digital signal;
a correlator which performs auto-correlation of the digital signal to output a correlation function; and
a controller which generates an image pattern corresponding to the correlation function and identifies whether to occupy the frequency band of interest according to the image pattern,
wherein the controller includes:
an image pattern generator which generates an image pattern corresponding to a changing pattern of the correlation function; and
a band occupation estimator which identifies whether to occupy the frequency band of interest based on the image pattern.

2. The spectrum sensing apparatus according to claim 1, wherein the correlator delays a time of the digital signal for a predetermined time to output the correlation function.

3. The spectrum sensing apparatus according to claim 1, wherein the image pattern generator generates the image pattern in which a brightness varies so as to correspond to a changing value in the changing pattern of the correlation function.

4. The spectrum sensing apparatus according to claim 1, wherein the image pattern increases a brightness of the image when the changing value of the changing pattern of the correlation function is higher than a predetermined reference value and lowers the brightness of the image when the changing value is lower than the predetermined reference value.

5. The spectrum sensing apparatus according to claim 1, wherein the band occupation estimator learns a signal correlation array by applying previous image patterns which are input in the past to a convolutional neural network (CNN) and when the image pattern is input, applies the image pattern to the signal correlation array to identify whether to occupy the frequency band of interest.

6. An operation method of spectrum sensing apparatus, comprising:
receiving an analog signal of a frequency band of interest, by a receiver;
sampling the analog signal to output a digital signal, by an ADC (Analog Digital Converter);
performing auto-correlation of the digital signal to output a correlation function, by a correlator; and
generating an image pattern corresponding to the correlation function and identifying whether to occupy the frequency band of interest according to the image pattern, by a controller,
wherein in identifying whether to occupy the frequency band of interest, the image pattern in which a brightness varies corresponding to a changing value is generated according to a changing pattern of the correlation function.

7. The operation method of a spectrum sensing apparatus according to claim 6, wherein the brightness of the image pattern increases when the changing value of the changing pattern of the correlation function is higher than a predetermined reference value and lowers when the changing value is lower than the predetermined reference value.

8. The operation method of a spectrum sensing apparatus according to claim 6, wherein in the identifying whether to occupy the frequency band of interest, a signal correlation array is learned by applying previous image patterns which are input in the past to a convolutional neural network (CNN) and when the image pattern is input, the image pattern is applied to a signal correlation array to identify whether to occupy the frequency band of interest.

9. An operation method of spectrum sensing apparatus, comprising:
receiving an analog signal of a frequency band of interest, by a receiver;
sampling the analog signal to output a digital signal, by an ADC (Analog Digital Converter);
performing auto-correlation of the digital signal to output a correlation function, by a correlator; and
generating an image pattern corresponding to the correlation function and identifying whether to occupy the frequency band of interest according to the image pattern, by a controller,
wherein a brightness of the image pattern increases when a changing value of a changing pattern of the correlation function is higher than a predetermined reference value and lowers when the changing value is lower than the predetermined reference value.

* * * * *